(12) United States Patent
Luerkens

(10) Patent No.: US 7,990,069 B2
(45) Date of Patent: Aug. 2, 2011

(54) METHOD AND CIRCUIT FOR DRIVING A GAS DISCHARGE LAMP

(75) Inventor: Peter Luerkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 376 days.

(21) Appl. No.: 12/158,290

(22) PCT Filed: Dec. 6, 2006

(86) PCT No.: PCT/IB2006/054629
§ 371 (c)(1), (2), (4) Date: Jun. 19, 2008

(87) PCT Pub. No.: WO2007/072265
PCT Pub. Date: Jun. 28, 2007

(65) Prior Publication Data
US 2008/0303450 A1 Dec. 11, 2008

(30) Foreign Application Priority Data
Dec. 21, 2005 (EP) .................................... 05112567

(51) Int. Cl.
*G05F 1/00* (2006.01)
(52) U.S. Cl. ............... 315/209 M; 315/209 R; 315/224; 315/225

(58) Field of Classification Search .................. 315/224, 315/225, 209 R, 247, 246, 274–289, 291, 315/307
See application file for complete search history.

(56) References Cited

U.S. PATENT DOCUMENTS

| 5,517,088 A | 5/1996 | Blom |
| 5,932,976 A | 8/1999 | Maheshwari et al. |
| 6,020,691 A | 2/2000 | Sun et al. |
| 6,124,682 A | 9/2000 | Lakin et al. |
| 6,194,845 B1 | 2/2001 | Konopka et al. |
| 2002/0190665 A1 | 12/2002 | Sun |

FOREIGN PATENT DOCUMENTS

EP 0405715 A1 2/1991

OTHER PUBLICATIONS

Written Opinion.

*Primary Examiner* — Tuyet Thi Vo

(57) ABSTRACT

A method for driving a gas discharge lamp and relates to a lamp driver circuit for driving a gas discharge lamp. The method includes supplying a current to the gas discharge lamp, reversing the direction of the current supplied to the gas discharge lamp and, substantially simultaneously, generating a relatively high voltage. The generated high voltage serves to prevent a series of re-ignitions of the gas discharge lamp that may lead to visible flickering of the gas discharge lamp or to extinction of the gas discharge lamp.

10 Claims, 1 Drawing Sheet

METHOD AND CIRCUIT FOR DRIVING A GAS DISCHARGE LAMP

FIELD OF THE INVENTION

The invention relates to a method and a circuit for driving a gas discharge lamp.

BACKGROUND OF THE INVENTION

In a known method for driving a gas discharge lamp, e.g. an automotive xenon lamp, an alternating current is supplied to the gas discharge lamp. For example, a square wave current of a frequency of about 400 Hz is generated in a lamp driver circuit. The lamp driver circuit may comprise a direct current source and a commutation circuit for converting a direct current into an alternating current. Further, an ignition circuit may be provided for igniting the lamp. The ignition circuit may comprise a pulse transformer to supply a desired voltage pulse for igniting the lamp.

In a known system comprising a driver circuit, an ignition circuit and a gas discharge lamp, it was observed that relatively short interruptions in the current occurred substantially immediately after a reversal of a direction of the current, in particular immediately after the current to the lamp passing zero current.

In the known lamp driver circuit, after the current reversal, a voltage output by the lamp driver circuit is substantially equal to the operating voltage, i.e. the voltage over the lamp during stable operation. A difference between the operating voltage of the lamp driver circuit and an actual lamp voltage over the lamp is relatively small. Due to the relatively small voltage difference and the inductance of the ignition circuit between the driver circuit and the lamp, a current change, in particular after the current passing a zero current level, is slow. With a slowly changing, i.e. increasing, current, the current interruptions occur. Although normally the interruptions may not be visible to a person, in some cases the interruptions lead to a visible flickering of the lamp. The lamp may even extinguish.

SUMMARY OF THE INVENTION

It is an object of the invention to provide a method and circuit for driving a gas discharge lamp, wherein the current interruptions are at least partly removed.

The object is achieved in a method of driving a gas discharge lamp, the method comprising supplying a current to the gas discharge lamp, thereby generating an operating voltage over the gas discharge lamp; reversing a direction of the current supplied to the lamp; and applying a reversal voltage higher than the operating voltage to the gas discharge lamp substantially simultaneously with the step of reversing the current.

By applying a reversal voltage having a voltage level substantially higher than the operating voltage, the voltage difference between the lamp driver voltage and the lamp voltage is increased. The increased voltage difference enables a faster current increase after the current passing a zero current level. Further, a higher re-ignition voltage is applied to the ignition circuit and thus to the gas discharge lamp. Advantageously, a maximum voltage level is supplied, when the lamp current crosses zero level. As a result, the current interruptions do not occur, or at least are diminished not to result in flickering and/or extinction of gas discharge lamp.

In an embodiment of the present invention, the reversal voltage is about twice as high as the operating voltage.

In an embodiment, the method according to the present invention comprises generating the reversal voltage by a resonant circuit.

In another aspect of the present invention, a lamp driver circuit for driving a gas discharge lamp is provided, the lamp driver circuit comprising: a current source for supplying a current to the gas discharge lamp; a commutation circuit operatively connected to the current source for reversing a direction of the current supplied to the gas discharge lamp; an ignition circuit connectable to the gas discharge lamp for generating an ignition voltage suitable to ignite the gas discharge lamp; and a reversal voltage generation circuit for generating a reversal voltage to be applied to the gas discharge lamp substantially simultaneously with a reversal of the direction of the current.

In an embodiment, the reversal voltage generation circuit is a resonant circuit connected to an output of the current source. A suitable resonant circuit is designed and configured to generate a relatively high voltage in response to an instantaneous polarity transition of a voltage supplied to the resonant circuit, i.e. the voltage supplied by the current source. It is noted that in the prior art, e.g. from U.S. Pat. No. 6,124,682, it is known to provide additional resonant circuits coupled to the output of the current source in order to provide a high ignition voltage in response to a high frequency ignition current (or voltage). In stable operation, i.e. after ignition, an operating current having a lower frequency is employed. Such a resonant circuit is however not suited for, i.e. not designed and configured to generate a suitably high voltage upon a current direction reversal during normal operation at said lower frequency.

BRIEF DESCRIPTION OF THE DRAWINGS

The above and other aspects of the invention are apparent from and will be elucidated with reference to the embodiments described hereinafter.

In the drawings.

DETAILED DESCRIPTION OF THE PREFERRED EMBODIMENTS

Figure 1:
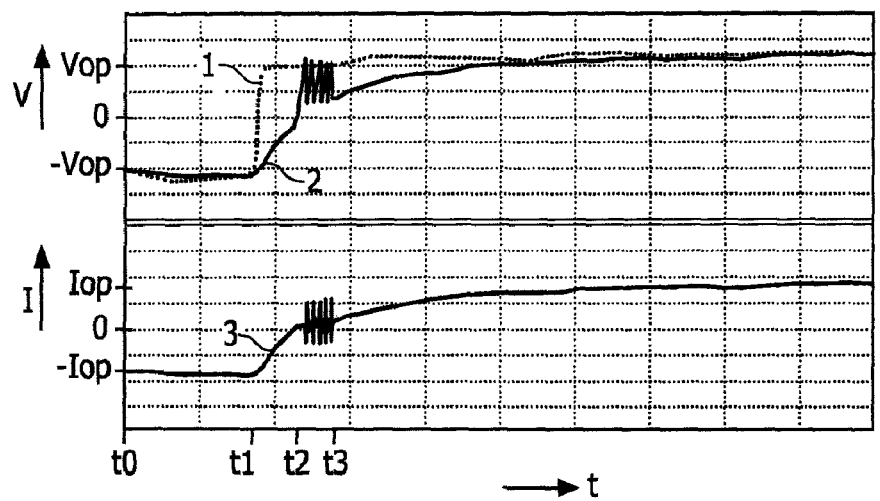
FIG. 1 illustrates a voltage and current graph as a function of time for a prior art lamp driver circuit.

FIG. 1 shows a graph of a lamp driver voltage 1, a lamp voltage 2 and a lamp current 3 (vertical axis) as a function of time t (horizontal axis). The lamp driver voltage 1, the lamp voltage 2 and the lamp current 3 have been measured on a prior art lamp driver circuit coupled to a gas discharge lamp, in particular an automotive xenon lamp.

In a stable operating period t0-t1, the lamp driver voltage 1 is at a negative operating voltage level −Vop. The lamp voltage 2 is substantially equal to the lamp driver voltage 1. The lamp current 3 is at a stable operating current level −Iop.

At time t1 the lamp driver voltage 1 is changed from a negative operating voltage level −Vop to a positive operating voltage level Vop virtually instantaneously. As a result, the lamp voltage 2 and the lamp current 3 start to change as well, but due to impedance in the circuitry, the lamp voltage 2 and the lamp current 3 change gradually. In a period t1-t2 the (absolute) lamp voltage 2 and the (absolute) lamp current 3 decrease to a zero level and after time t2 the lamp voltage 2 and the lamp current 3 start to increase again in the opposite direction.

The increase of the lamp current 3 is very slow at zero current, as appears from the shown graph of the lamp current 3. This slow increase is a result from the relatively small difference between the lamp driver voltage 1 and the lamp voltage 2, which difference is the driving force for the current increase. Due to the low current level, a number of re-ignitions of the lamp occur in the period t2-t3. After time t3, the lamp current 3 has reached such a current level, that the lamp is stably ignited and the lamp current 3 can increase gradually again.

Figure 2:
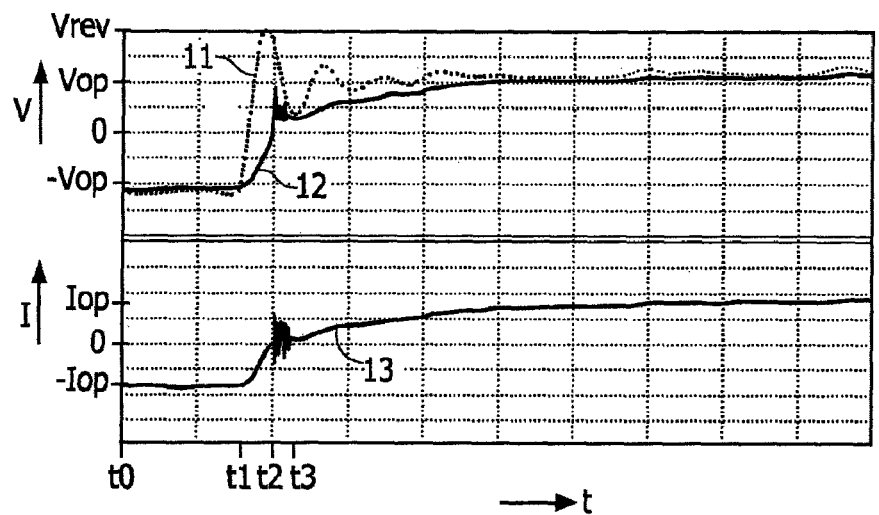
FIG. 2 illustrates a voltage and current graph as a function of time for a lamp driver circuit according to the present invention.

FIG. 2 shows a graph of a lamp driver voltage 11, a lamp voltage 12 and a lamp current 13 (vertical axis) as a function of time t (horizontal axis). The lamp driver voltage 11, the lamp voltage 12 and the lamp current 13 have been measured on a lamp driver circuit according to the present invention coupled to a gas discharge lamp, in particular an automotive xenon lamp.

In a stable operating period t0-t1, the lamp driver voltage 11 is at a negative operating voltage level −Vop. The lamp voltage 12 is substantially equal to the lamp driver voltage 11. The lamp current 13 is at a stable operating current level −Iop.

At time t1 the lamp driver voltage 11 is changed from a negative operating voltage level −Vop to a positive reversal voltage level Vrev and eventually the lamp driver voltage 11 changes to a positive operating voltage level Vop. As a result, the lamp voltage 12 and the lamp current 13 start to change as well, but due to impedance in the circuitry, the lamp voltage 12 and the lamp current 13 change gradually. In a period t1-t2 the (absolute) lamp voltage 12 and the (absolute) lamp current 13 decrease to zero and after time t2 the lamp voltage 12 and the lamp current 13 start to increase again in the opposite direction.

The change in the lamp driver voltage 11 is configured to reach the reversal voltage level Vrev at time t2. Thus, at time t2, a difference between the lamp voltage 12 and the lamp driver voltage 11 is at a maximum. Since said difference is the driving force for a current increase after time t2, the lamp current 13 increases rapidly compared to the current increase as shown in FIG. 1. Due to the rapid increase of the lamp current 13 at the zero crossing of the lamp current 13, the lamp may re-ignite rapidly preventing at least a number of the re-ignitions as shown in and described in relation to FIG. 1, although some re-ignitions may still occur as is apparent from the ripples in the lamp current 13 in the time period t2-t3.

Figure 3:
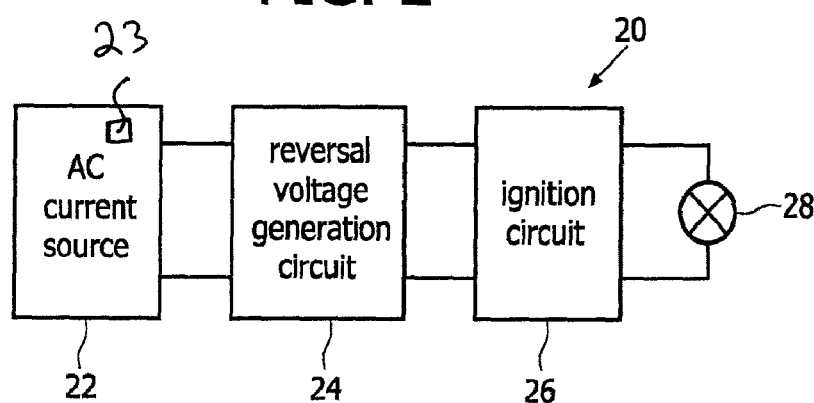
FIG. 3 illustrates an embodiment of a lamp driver circuit according to the present invention.

The graph of the lamp driver voltage 11, as shown in FIG. 2, after the change from a negative voltage level to a positive voltage level is generated by a resonant circuit added to a prior art lamp driver circuit as is shown in FIG. 3. The lamp driver circuit 20 comprises an alternating current source 22 which includes commutation circuit 23 for reversing a direction of the current supplied to the gas discharge lamp, a reversal voltage generation circuit 24, an ignition circuit 26 and is coupled to a gas discharge lamp 28. The alternating current source 22 may be a prior art current source or any other suitable kind of current source. For example, the alternating current source 22 comprises a direct current source and a commutation circuit of a half-bridge or a full-bridge configuration of a number of electronic switches, such as suitable transistors. The ignition circuit 26 may also be a prior art ignition circuit or any other suitable kind of ignition circuit, for example a voltage pulse igniter, generating a high voltage pulse for igniting the gas discharge lamp 28. The reversal voltage generation circuit 24 is designed and configured to generate a relatively high voltage, when the lamp driver voltage output by the alternating current source 22 switches from a negative level to a positive level, or from a positive level to a negative level.

In an embodiment, the reversal voltage generation circuit 24 is a resonant circuit, e.g. comprising one or more capacitance elements, one or more inductance elements and/or one or more other electronic elements. In response to the abrupt voltage change of the lamp driver voltage the resonant circuit 24 generates a high voltage, i.e. the reversal voltage. As shown in FIG. 2 the reversal voltage level as generated by a suitable resonant circuit 24 may be twice as high as an operating voltage level, for example. At the operating voltage level the gas discharge lamp 28 may operate stably. It is noted that the person skilled in the art of designing a resonant circuit understands how to design the resonant circuit 24 and is capable of doing so such that a desired and appropriate voltage level is generated upon the abrupt voltage change of the alternating current source 22.

In FIGS. 2 and 3 and their respective discussions above, it is shown and described that the reversal voltage may be generated by a resonant circuit added to a prior art lamp driver circuit. It is noted that such a resonant circuit is merely an embodiment of the present invention. Such an embodiment is simple, and cost-effective, e.g. it may easily be integrated into the prior-art lamp driver circuit. Other embodiments may for example comprise an additional voltage source, which supplies an additional voltage in response to the voltage change on the output terminals of the alternating current source. Further, in an embodiment, the oscillation of the lamp driver voltage after reaching the reversal voltage level as shown in FIG. 2 may be removed in order to prevent the small number of re-ignitions that still occur. This small number of re-ignitions is illustrated by the ripples in the lamp current (FIG. 2, reference numeral 13) in the time period t2-t3 (FIG. 2).

The invention claimed is:

1. A method of driving a gas discharge lamp, the method comprising the acts of:
   igniting the gas discharge lamp using ignition pulses having an ignition frequency;
     after ignition of the gas discharge lamp, operating the gas discharge lamp at an operating voltage by supplying a current to the gas discharge lamp, thereby generating the operating voltage over the gas discharge lamp;
     after the ignition and removal of the ignition pulses, reversing a direction of the current supplied to the gas discharge lamp at an operating frequency which is lower than the ignition frequency to reverse the operating voltage at the operating frequency; and
     after the ignition and the removal of the ignition pulses, applying at the operating frequency a reversal voltage higher than the operating voltage to the gas discharge lamp substantially simultaneously with the reversing act.

2. The method according to claim 1, wherein the reversal voltage is about twice the operating voltage.

3. The method according to claim 1, wherein the reversal voltage has a maximum value when the current supplied to the gas discharge lamp is substantially zero.

4. The method of claim 1, wherein the operating frequency is about 400 Hz.

5. The method according to claim 1, wherein the method comprises generating the reversal voltage by a resonant circuit.

6. The method of claim 5, wherein the resonant circuit is configured to resonate at the operating frequency.

7. A lamp driver circuit for driving a gas discharge lamp, the driver circuit comprising:
- a current source for supplying a current to the gas discharge lamp;
- a commutation circuit operatively connected to the current source for reversing a direction of the current supplied to the gas discharge lamp;
- an ignition circuit connectable to the gas discharge lamp for generating ac ignition pulses suitable to ignite the gas discharge lamp, the ignition pulses having an ignition frequency, wherein the ignition circuit is configured to stop providing the ignition pulses after ignition of the gas discharge lamp; and
- a reversal voltage generation circuit for generating a reversal voltage higher than an operating voltage to be applied to the gas discharge lamp substantially simultaneously with a reversal of the direction of the current, wherein the reversal voltage generation circuit is configured to provide the reversal voltage after the ignition and removal of the ignition pulses, the reversal voltage having an operating frequency which is lower than the ignition frequency to reverse the operating voltage at the operating frequency.

8. The lamp driver circuit according to claim 7, wherein the reversal voltage generation circuit is a resonant circuit connected to an output of the current source.

9. The lamp driver circuit of claim 8, wherein the operating frequency is approximately 400 Hz.

10. The lamp driver circuit of claim 8, wherein the resonant circuit is configured to resonate at the operating frequency.

* * * * *